(12) United States Patent
Hamel et al.

(10) Patent No.: US 7,781,943 B1
(45) Date of Patent: Aug. 24, 2010

(54) CAPACITIVE DISCHARGE ENERGY HARVESTING CONVERTER

(75) Inventors: Michael J. Hamel, Essex Junction, VT (US); David L. Churchill, Burlington, VT (US)

(73) Assignee: Micro Strain, Inc., Williston, VT (US)

( * ) Notice: Subject to any disclaimer, the term of this patent is extended or adjusted under 35 U.S.C. 154(b) by 0 days.

(21) Appl. No.: 12/009,945

(22) Filed: Jan. 23, 2008

Related U.S. Application Data

(60) Provisional application No. 60/897,171, filed on Jan. 24, 2007.

(51) Int. Cl.
*H02N 2/18* (2006.01)
(52) U.S. Cl. ..................................................... 310/339
(58) Field of Classification Search ................. 310/339, 310/319, 328, 316.01, 316.03, 317; 307/151; *H02N 2/18; H01L 41/113*
See application file for complete search history.

(56) References Cited

U.S. PATENT DOCUMENTS

| | | | |
|---|---|---|---|
| 4,404,502 A * | 9/1983 | Magori et al. ............... 310/328 |
| 6,407,483 B1 | 6/2002 | Nunuparov | |
| 6,433,645 B1 * | 8/2002 | Mann et al. .................... 331/18 |
| 6,528,928 B1 * | 3/2003 | Burns et al. ................. 310/339 |
| 7,081,693 B2 | 7/2006 | Hamel | |
| 7,256,505 B2 | 8/2007 | Arms | |
| 7,271,564 B2 * | 9/2007 | Ramu ....................... 318/254.1 |
| 7,474,035 B2 * | 1/2009 | Fukagawa et al. ...... 310/316.03 |
| 2007/0114890 A1 | 5/2007 | Churchill | |
| 2008/0036617 A1 | 2/2008 | Arms | |

OTHER PUBLICATIONS

U.S. Appl. No. 11/644,038, filed Dec. 22, 2006, Churchill.
U.S. Appl. No. 11/644,334, filed Dec. 22, 2006, Churchill.

* cited by examiner

*Primary Examiner*—Walter Benson
*Assistant Examiner*—Karen B Addison
(74) *Attorney, Agent, or Firm*—James Marc Leas

(57) ABSTRACT

An energy harvesting circuit includes a device for converting mechanical energy into electrical energy, a solid state voltage dependent switch, and an inductor. The piezoelectric device, the solid state voltage dependent switch, and the inductor are all connected in series. The solid state voltage dependent switch has a first threshold The solid state voltage dependent switch remains open until voltage applied across the solid state voltage dependent switch by the device reaches the first threshold. When the voltage applied across the solid state voltage dependent switch reaches the first threshold the solid state voltage dependent switch closes so charge from the device flows through the switch and through the inductor.

24 Claims, 4 Drawing Sheets

CAPACITIVE DISCHARGE ENERGY HARVESTING CONVERTER

RELATED APPLICATIONS AND PRIORITY

This application claims priority of Provisional Patent Application 60/897,171, filed Jan. 24, 2007, incorporated herein by reference.

This provisional application is related to the following commonly assigned patent applications:

"Energy Harvesting for Wireless Sensor Operation and Data Transmission," U.S. Pat. No. 7,081,693 to M. Hamel et al., filed Mar. 5, 2003 ("the '693 patent").

"Shaft Mounted Energy Harvesting for Wireless Sensor Operation and Data Transmission," U.S. patent application Ser. No. 10/769,642 to S. W. Arms et al., filed Jan. 31, 2004 ("the '642 application").

"Slotted Beam Piezoelectric Composite," U.S. Provisional Patent Application No. 60/739,976 to D. L. Churchill, filed Nov. 23, 2005, ("the '976 application").

"Energy Harvesting, Wireless Structural Health Monitoring System," U.S. patent application Ser. No. 11/518,777 to S. W. Arms et al., filed Sep. 11, 2006 ("the '777 application").

"Sensor Powered Event Logger," U.S. patent application Ser. No. 11/644,038 to D. L. Churchill et al., filed Dec. 22, 2006 ("the '038 application").

"Integrated Piezoelectric Composite and Support Circuit," U.S. patent application Ser. No. 11/644,334 to D. L. Churchill et al., filed Dec. 22, 2006 ("the '334 application").

All of the above listed patents and patent applications are incorporated herein by reference.

BACKGROUND

Piezoelectric energy harvesting converter circuits have been implemented by simply connecting the piezoelectric element to a rectifier and storage capacitor. However, the present applicants found that this direct charge topology converts mechanical energy into electrical energy with a low overall efficiency.

Most electronic circuits that are powered by a piezoelectric energy harvesting converter circuit, such as a microprocessor, operate at much lower voltage than is supplied by the piezoelectric material. The '693 patent describes an improved method of providing a small storage capacitor that is charged to a high voltage by the piezoelectric device and that is generally matched to the impedance of the piezoelectric device. Then charge is transferred via a DC-DC converter into a large storage capacitor, effectively providing a low voltage energy source to power electronic circuits requiring a low voltage.

Suppliers of piezoelectric materials partially addressed the voltage disparity problem by providing piezoelectric materials that deliver a higher current and a lower voltage than was previously available. However, the voltage delivered is still much higher than needed by the electronic circuits and so the DC-DC converter of the '693 application was still advantageous.

The topology of the '693 patent significantly improved efficiency compared to that of the direct charge method alone. However the technique of the '693 patent still limited efficiency because the maximum input voltage that could be applied to the DC-DC converter was around 35 volts, much lower than the 150 volts that was generated by the piezoelectric device. The scheme of the '693 patent also stopped working when available energy was below that required to supply the quiescent current of the DC-DC converter to keep it operating and providing the DC-DC conversion.

U.S. Pat. No. 6,407,483 to Nunuparaov et al ("the '483 patent") describes an alternate voltage conversion scheme that uses a gas tube and a transformer between the piezoelectric element and the rectifier stage. The gas tube provides a series switch that conducts when the voltage generated by the piezoelectric element reaches a sufficiently high voltage. The threshold for conduction is determined by the type of gas and the spacing of the contacts within the gas tube. Conduction continues for a brief period of time while the piezoelectric element maintains sufficient voltage. A transformer steps down the AC voltage resulting from the impulse in the gas discharge arising from the electricity generated by the piezoelectric element. That lower AC voltage is then rectified and used for powering electronic circuits.

However, gas tubes have a relatively short life with repetitive discharges. A voltage drop during the arc also dissipates a significant amount of the energy provided by the piezoelectric element, lowering efficiency. Transformers introduce additional inefficiency, and are expensive to manufacture. Transformers also are limited to a specified frequency range. In addition, rectifiers introduce a voltage loss which is a more significant fraction of the voltage for a low voltage signal than for a high voltage signal. So locating the rectifiers at the low voltage side of the circuit is less efficient than would be the case with a scheme that provides rectification of the high voltage signal.

The '483 patent also mentions that a thyristor or other semiconductor device can provide the switching in place of a gas discharge tube. The present applicants found, however, that semiconductor thyristors capable of operating at the high voltages provided by piezoelectric devices needed much more current than was available from the high voltage piezoelectric materials.

The circuit with small and large capacitors and the DC-DC converter of the '693 patent was significantly more efficient for powering electronics with a piezoelectric energy harvesting converter than was a direct charge topology. Nevertheless, a better scheme is still needed to provide significantly higher efficiency conversion of mechanical energy into electricity for powering electronic circuits using a piezoelectric energy harvesting converter circuit, and this solution is provided by the following description.

SUMMARY

One aspect of the present patent application is an energy harvesting circuit comprising a device for converting mechanical energy into electrical energy, a solid state voltage dependent switch, and an inductor. The piezoelectric device, the solid state voltage dependent switch, and the inductor are all connected in series. The solid state voltage dependent switch has a first threshold. The solid state voltage dependent switch remains open until voltage applied across the solid state voltage dependent switch by the device reaches the first threshold. When the voltage applied across the solid state voltage dependent switch reaches the first threshold the solid state voltage dependent switch closes so charge from the device flows through the switch and through the inductor.

DETAILED DESCRIPTION

Figure 1A:
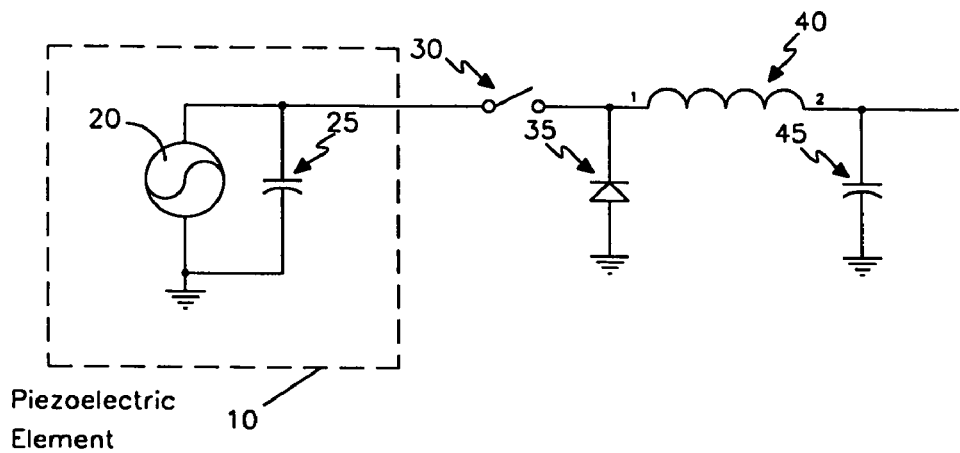
FIGS. 1a and 1b show block diagrams of embodiments of a capacitive discharge energy harvester circuit including a piezoelectric device having an intrinsic capacitance, a voltage dependent switch, a rectifier, an inductor, and a storage capacitor, and showing alternate arrangements of a diode.

The present applicants designed a circuit that substantially improves energy conversion efficiency. The circuit takes advantage of the intrinsic capacitance of the piezoelectric device to store charge generated from mechanical strain or vibration, providing this storage at the high voltage of the piezoelectric device and eliminating loss from charging another potentially mismatched capacitor. One side of the piezoelectric device is connected to ground. Diodes provide a positive polarity to the entire electrical signal generated from the back and forth movement of the piezoelectric device. Once a threshold voltage has been reached a voltage dependent switch in the circuit rapidly discharges that stored charge through a rectifier and through a high speed switch to an inductor and capacitor network that converts to a lower DC voltage suitable for use powering electronic circuits. Because the entire charge on the intrinsic capacitance of the piezoelectric device is rapidly discharged no oscillator is needed for this DC-DC conversion. Eliminating the oscillator removes an important source of power consumption while maintaining a high efficiency energy transfer.

Unlike previous converter designs, in the present embodiment, when switch 30 is off piezoelectric device 10 is not substantially loaded, and is disconnected from almost all sources of loss. Thus, its voltage can rise quickly to a high value when mechanical energy is applied to piezoelectric device 10. Only when the voltage across piezoelectric device 10 has risen to the threshold of voltage dependent switch 30, and voltage dependent switch 30 turns on, is energy first drawn from piezoelectric device 10 to ultimately charge storage capacitor 45. A battery can be used in place of or in addition to capacitor 45. Threshold is chosen to be slightly less than the expected open circuit voltage for expected mechanical excitations. In one embodiment threshold was set to 140 volts. In previous designs, such as the embodiments described in the '693 patent, current was drawn from the piezoelectric device as soon as the generated voltage exceeded the two diode forward drops of the full wave rectifier plus the voltage from charge already stored in the storage capacitor from previous energy conversions. These previous designs wasted energy because they did not allow voltage to rise to a high value. By contrast, in the circuit of FIGS. 2a, 2b, by delaying transfer of charge until the threshold voltage is reached, the present circuit design can achieve substantially higher energy conversion efficiency. The threshold voltage is set to be slightly less than the expected open circuit voltage to achieve greatest efficiency.

Energy stored in a capacitance can be described as $$E = \tfrac{1}{2}CV^2$$

where C is the capacitance, and V is the voltage across the capacitance. Because the energy stored depends on the square of the voltage, high voltage type piezoelectric materials provide substantial advantage. However, the high voltage and high impedance of such materials also introduces difficulty in converting to the low voltage and low impedance needed by typical electronic circuits. By using intrinsic capacitance 25 of piezoelectric device 10 instead of providing a separate capacitor, as in the '693 patent, the present inventors found a way to retain the high voltage and high impedance through this first stage of charge storage, significantly improving energy conversion efficiency.

Figure 1B:
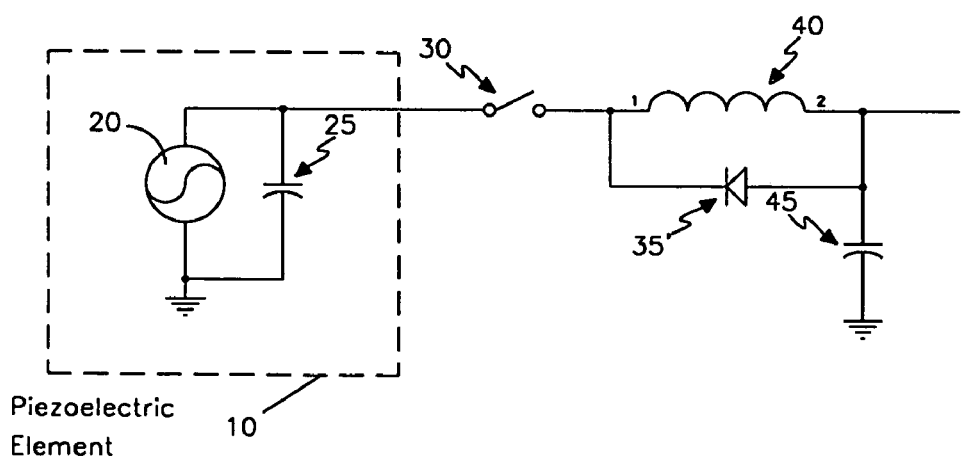

Piezoelectric element 10 is modeled as generator 20 with intrinsic capacitance 25 in parallel, as shown in FIGS. 1a, 1b. As mechanical energy is applied to piezoelectric element 10 on its dependent axis, intrinsic capacitance 25 is charged to a voltage proportional to the applied mechanical energy. One embodiment, further described herein below, provides that when the voltage on capacitance 25 reaches a preset threshold, switch 30 closes, allowing the charge on capacitance 25 to flow into inductor 40. Inductor 40 stores energy in a magnetic field while switch 30 is on and current is flowing from intrinsic capacitor 25 in piezoelectric device 10. When intrinsic capacitor 25 has discharged to a second threshold voltage, voltage dependent switch 30 opens, current through inductor 40 decreases rapidly, and this magnetic field around inductor 40 collapses. The second threshold voltage may be set to provide for nearly complete discharge of intrinsic capacitor 25. The rapid reduction in current and rapid collapse of the magnetic field when switch 30 opens induces a voltage across inductor 40 according to the equation $$V = L\, di/dt$$

This induced voltage across inductor 40 provides a current through diode 35 charging large storage capacitor 45. This voltage across storage capacitor 45 is substantially lower than the voltage across piezoelectric device 10. A correspondingly higher charge is stored on capacitor 45.

Figure 2A:
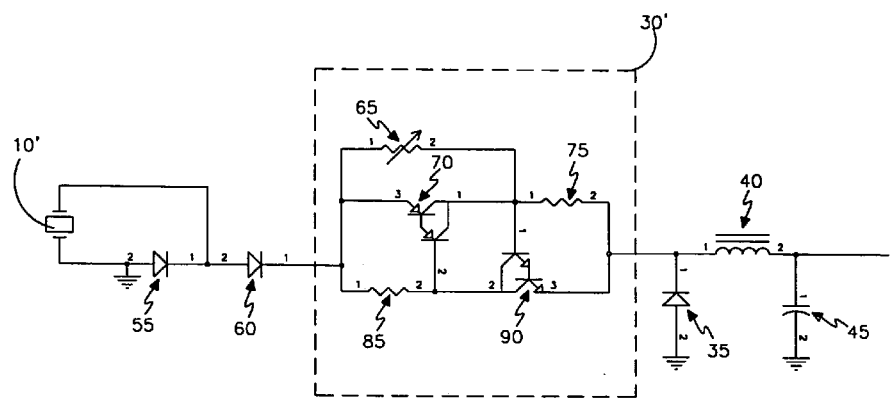
FIGS. 2a and 2b show detailed schematic diagrams of the voltage dependent switches of FIGS. 1a and 1b, also showing alternate arrangements of a diode.
Figure 2B:
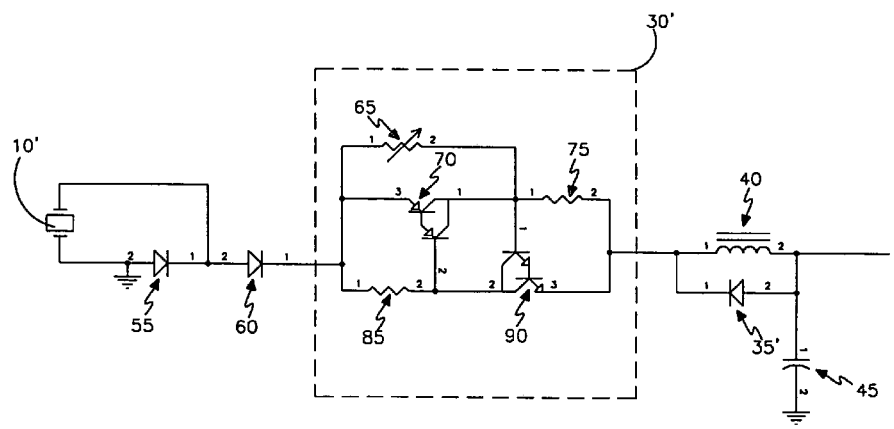

The present applicants designed an efficient voltage dependent switch with very low off state leakage current and a very low on state resistance to enable operation of this circuit, as shown in FIGS. 2a, 2b. Because piezoelectric device 10', voltage dependent switch 30', and inductor 40 are all in series, leakage current through voltage dependent switch 30' does not detract from the efficiency of the circuit. Leakage current just goes to charge storage capacitor 45.

To operate most efficiently, switch 30 closes at a first threshold when the voltage across intrinsic capacitance 25 is slightly less than the expected maximum open circuit voltage piezoelectric device 10 will attain for the mechanical energy input. Switch 30 later opens at a second threshold when intrinsic capacitance 25 is nearly discharged. Switch 30 has been designed to attain a very low resistance quickly when closed to avoid resistive losses. It also has a very high resistance when open, allowing very little leakage current.

The more detailed embodiment of the circuit of FIGS. 1a, 1b shown in FIGS. 2a, 2b includes voltage dependent switch 30' that includes Darlington transistors 70 and 90. Each of these transistors needs only micro-ampere base currents to turn on, and the Darlington arrangement provides a very high gain. The two Darlington transistors 70 and 90 are arranged in the circuit so that the turning on of one causes the other to also turn on and vice versa. The two Darlington transistors 70, 90 remain latched up until intrinsic capacitance 25 of piezoelectric element 10' has nearly discharged and the voltage provided from intrinsic capacitance 25 has declined to close to zero. At that point Darlington transistors 70 and 90 turn off and reset for the next time charge is available from piezoelectric device 10'. PNP Darlington transistor 70 has part number FZT705 and NPN Darlington transistor 90 has part number FZT605. Both are available from Zetex, Manchester, UK.

Darlington transistor 90 remains off while the voltage across its base emitter junction 1-3 remains below its 1.2 volt turn on threshold. This voltage is controlled by a voltage divider formed by resistors 65 and 75. In practice, any leakage current through Darlington transistor 70 from collector to emitter adds to the current through resistor 65 and forms part of this voltage divider. When a threshold of approximately 150 volts is provided by piezoelectric device 10' and applied across voltage dependent switch 30', the voltage at transistor 90 base emitter junction, reaches the 1.2 volt turn-on threshold, and transistor 90 turns on. The voltage across resistor 85 and across the base-emitter junction from pins 2-3 of Darlington transistor 70 now also equals at least 1.2 volts, and transistor 70 turns on. This provides a high voltage to the base at pin 1 of Darlington transistor 90, keeping the transistor on. While the two Darlington transistors 70, 90 remain thus latched up, intrinsic capacitance of piezoelectric element 10' is nearly completely discharged into inductor 40 through diode 60. Voltage dependent switch 30' continues to conduct until the intrinsic capacitance of piezoelectric element 10' is nearly completely discharged.

Since voltage dependent switch 30' always turns on at the same threshold voltage, and since the intrinsic capacitance of the piezoelectric device is also a constant, every closure of switch 30' transfers the same amount of energy, independent of the energy of the mechanical event producing it, so long as the energy of the mechanical event is sufficient to reach the threshold.

Rather than using a full wave bridge rectifier as in the embodiments of the '693 patent, one side of piezoelectric device 10' is connected to ground and shunt diode 55 is used to provide that the entire signal from piezoelectric element 10' and its intrinsic capacitance 25 is positive. Thus, the peak voltage provided by piezoelectric element 10' is twice the value that would be provided from the same mechanical excitation applied to a circuit using a full wave bridge rectifier that provides a signal centered at 0 volts.

While this half wave rectifier configuration is desirable for applications where mechanical energy input is cyclic, a full wave bridge rectifier can be used where mechanical energy input is random in frequency or is of unknown direction. With a full wave rectifier, half the voltage is reached but twice as often. Thus, the type of rectifier used determines both the magnitude of the voltage achieved and how often the switch fires.

A lab controlled test was performed with a steel beam mounted with high voltage piezoelectric material. The beam was mounted on a four point bending fixture to ensure uniform strain field. Strain gages were mounted to the beam to calibrate the strain levels and the four point bending fixture was excited to 220 microstrain at 4 Hz using a closed loop voice coil actuator. The piezoelectric material was first connected to a direct charging energy harvesting circuit and sequentially loaded with resistance increments from 30K through 300K provided across capacitor 45. Output power was recorded for each resistance increment. The same test and load resistance increments were repeated for the intrinsic capacitive discharge energy harvesting (CDEH) circuit of FIG. 2a.

Figure 3:
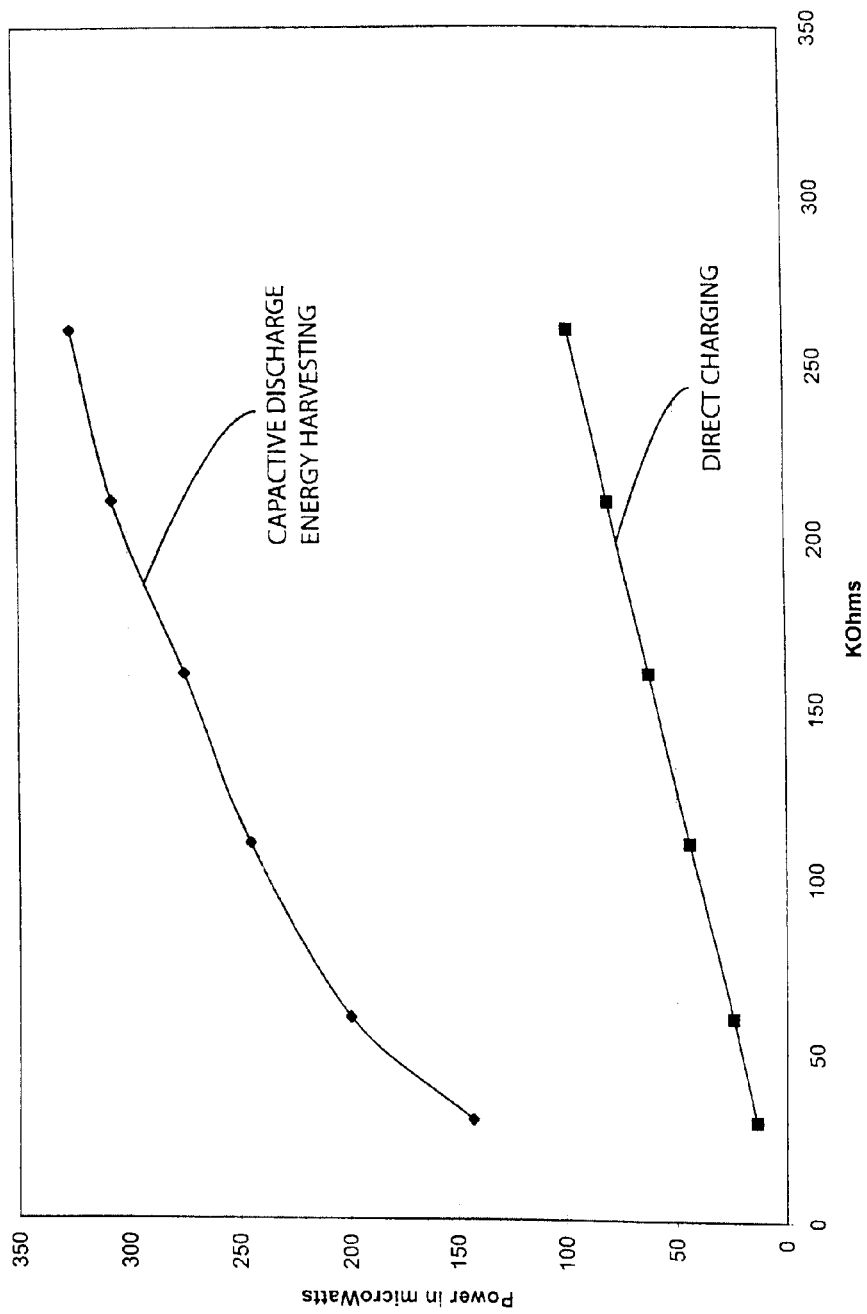
FIG. 3 shows data comparing the embodiment of FIG. 2a with a direct charging circuit as a function of load resistance.

Power dissipated by a load, P is given by $$P=V^2/R$$

where V is the voltage across the load and R is the resistance of the load. Results plotted in FIG. 3 show the power delivered to the load for the different circuits and the different load resistance values. With the 30K resistive load, the CDEH circuit had more than a tenfold improvement in power delivered to the load as compared to the direct charging circuit, given an identical mechanical input. With the 260K resistive load the improvement was over threefold. Thus, the CDEH circuit of FIG. 2a provides a substantial increase in efficiency compared to the direct charging circuit for the same piezoelectric material, mechanical input, and load.

Because the oscillator of traditional DC-DC converters was eliminated, applicants found that voltage dependent switch 30' of the circuit of FIG. 2a required no constant quiescent current to function, other than the very small off-state leakage current of Darlington transistors 70 and 90 which is in the 10 nA range, and is about three orders of magnitude less than the quiescent current of the lowest currently available traditional DC-DC converter that uses an oscillator.

Substantial improvement in efficiency arises because piezoelectric element 10' was essentially without electrical loading while intrinsic capacitance 25 was charging during the time before voltage dependent switch 30' reached its closing threshold voltage. This also reduced losses from mechanical loading by piezoelectric element 10' on the structure providing the mechanical energy because voltage dependent switch 30' remained open.

Applicants also provided a way to adjust the switching threshold of voltage dependent switch 30' to provide maximum efficiency when there were large variations in the mechanical energy to be harvested. This adjustment can be provided manually by providing resistor 65 as a variable resistor. An array of fixed resistance values can also be used and switched in.

In another embodiment, diode 35' is connected across inductor 40, as shown in FIGS. 1b, 2b. In this embodiment, the voltage across inductor 40 is referenced to the voltage across capacitor 45 rather than to ground, as in FIGS. 1a, 1b. Now the voltage across inductor 40 cannot go more than a diode drop below the voltage across capacitor 45. Thus, energy is not drawn out of the capacitor, as would be the case in the embodiment of FIG. 1a, 2a in which the voltage across inductor 40 can go a diode drop below ground—which may be several volts below the voltage across capacitor 45. Thus, the embodiment of FIGS. 1b, 2b should be more efficient in its DC-DC conversion than the embodiment of FIGS. 1a, 2a.

Figure 4:
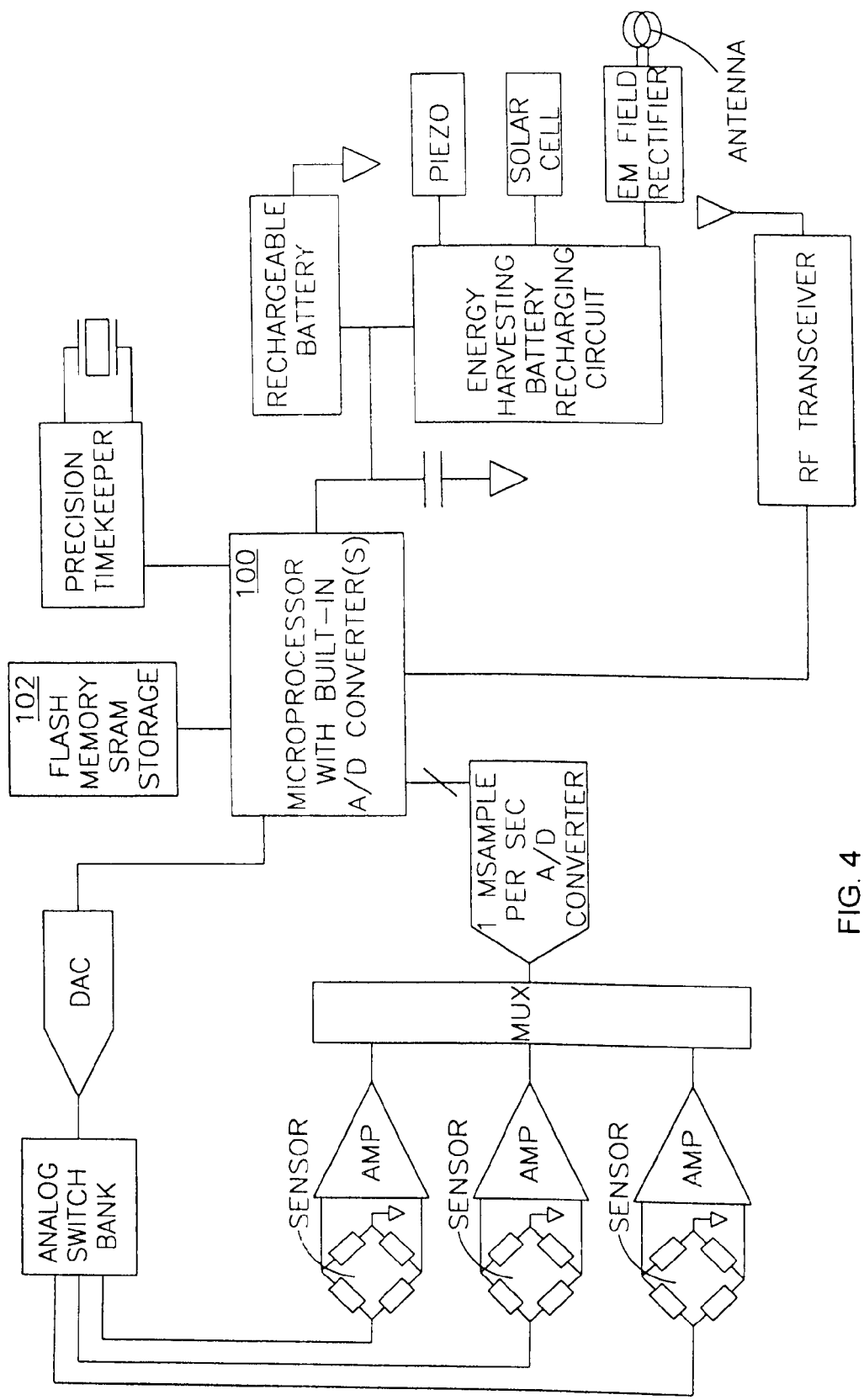
FIG. 4 shows a block diagram including a piezoelectric device, an energy harvesting and battery recharging circuit of FIG. 2a, a rechargeable battery, and electronic circuits including a microprocessor, memory, RF transceiver, and sensors powered by the energy harvester circuit.

Applicants also found that the CDEH circuit provided useful information regarding the mechanical event that it harvests power from because each closure of voltage dependent switch 30' requires a mechanical strain magnitude above a known minimum threshold to operate. The energy can be used to power devices, such as microprocessor 100 and memory device 102 for recording the number of switch closures or the frequency of switch closures, as shown in FIG. 4 and as described in the '777 application. This provides information as to how often there was a mechanical event, for example.

The CDEH circuit allows for piezoelectric energy harvesting from mechanical strain energy even from a single event, such as a single impact. It also allows harvesting energy from infrequent, cyclic, or random periodic events. These events may include a weapon or explosive discharge, an accidental or intentional impact, cyclic, periodic or random strain in vehicular structures and control members, and strain events in civil structures. Most of these infrequent mechanical events do not contain sufficient average energy to allow direct charging piezoelectric energy harvesting to function. With the CDEH circuit the applicants found that such events provide enough energy to operate electronic circuits. For example, the CDEH circuit can be used to provide power to monitor sensors such as tire pressure and temperature sensors. The present applicants found that enough energy can be harvested from only one revolution of a tire to measure temperature and pressure within the tire and store the data.

The CDEH circuit can also be used for event counting. In US patent application US2003/0061753, Glock describes a pistol with a piezoelectric sensor and circuits to detect and count rounds fired and to store the number of rounds fired. However the circuits use a battery for their source of energy. The CDEH circuit can be used to power such a counter circuit without the need for any batteries or external power source. The counter circuit thereby also serves as a detection sensor.

The CDEH circuit of the present patent application provides substantially more energy than direct charging methods. The CDEH circuit can quickly harvest a sufficient energy to record data whereas the direct charging circuit requires many cycles of mechanical input before a usable amount of energy has been accumulated.

What is claimed is:

1. An energy harvesting circuit, comprising an energy harvesting device, a solid state voltage dependent switch, and an inductor, wherein said solid state voltage dependent switch is connected between said energy harvesting device and said inductor, wherein said energy harvesting device converts mechanical energy into electrical energy, wherein said solid state voltage dependent switch has a first threshold and a second threshold, wherein said second threshold is below said first threshold, wherein said solid state voltage dependent switch remains open until voltage applied across said solid state voltage dependent switch from said energy harvesting device to said inductor reaches said first threshold, wherein when said voltage applied across said solid state voltage dependent switch reaches said first threshold said solid state voltage dependent switch closes so charge from said energy harvesting device flows through said solid state voltage dependent switch and through said inductor, wherein when said voltage applied across said solid state voltage dependent switch then falls below said second threshold said solid state voltage dependent switch reopens.

2. An energy harvesting circuit as recited in claim 1, further comprising a solid state pulsed DC-DC converter, wherein said solid state pulsed DC-DC converter includes said solid state voltage dependent switch and said inductor.

3. An energy harvesting circuit as recited in claim 2, wherein said DC-DC converter comprises a step down converter.

4. An energy harvesting circuit as recited in claim 1, further comprising a diode connected in parallel with said inductor.

5. An energy harvesting circuit as recited in claim 1, further comprising a diode having a cathode and an anode, wherein said cathode is connected between said voltage dependent switch and said inductor and wherein said anode is connected to ground.

6. An energy harvesting circuit as recited in claim 1, further comprising a threshold adjusting device, wherein said threshold adjusting device adjusts said first and said second threshold.

7. An energy harvesting circuit as recited in claim 6, wherein said threshold adjusting device includes a variable resistor.

8. An energy harvesting circuit as recited in claim 1, further comprising an energy storage element, wherein energy from said inductor provides charge to said energy storage element when said voltage falls below said second threshold.

9. An energy harvesting circuit as recited in claim 1, wherein said voltage dependent switch remains open until a voltage greater than 100 volts is provided across said voltage dependent switch.

10. An energy harvesting circuit as recited in claim 9, wherein said energy harvesting device provides a voltage that is greater than 100 volts.

11. An energy harvesting circuit as recited in claim 1, wherein said energy harvesting device includes intrinsic capacitance.

12. An energy harvesting circuit as recited in claim 11, wherein all energy provided to said inductor comes from energy stored in said intrinsic capacitance.

13. An energy harvesting circuit as recited in claim 1, further comprising a first diode and a second diode between said energy harvesting device and said voltage dependent switch, wherein said first diode is connected in parallel with said energy harvesting device and wherein said second diode is connected in series with said energy harvesting device and with said voltage dependent switch.

14. An energy harvesting circuit as recited in claim 1, further comprising an energy storage element.

15. An energy harvesting circuit as recited in claim 14, further comprising an energy using element, wherein said energy storage element provides energy for use by said energy using element.

16. An energy harvesting circuit as recited in claim 14, wherein said energy storage element includes at least of one from the group consisting of a capacitor and a battery.

17. An energy harvesting circuit as recited in claim 1, wherein said voltage dependent switch includes two Darlington transistors.

18. An energy harvesting circuit as recited in claim 15, wherein said energy using element includes a sensor, a microprocessor, a memory, and an RF transceiver.

19. An energy harvesting circuit as recited in claim 1, wherein said energy harvesting device includes a piezoelectric device.

20. An energy harvesting circuit as recited in claim 1, wherein when said solid state voltage dependent switch is open said solid state voltage dependent switch disconnects said energy harvesting device from substantially all sources of loss of charge.

21. A circuit as recited in claim 19, further comprising a source of mechanical energy, wherein said piezoelectric device is connected to said source of mechanical energy for receiving at least one from the group consisting of mechanical strain energy and vibration energy.

22. A circuit as recited in claim 1, wherein said solid state voltage dependent switch is capable of closing to transfer charge when said energy harvesting device is receiving mechanical energy from a single event, and wherein said solid state voltage dependent switch is capable of reopening subsequently.

23. A circuit as recited in claim 1, wherein said solid state voltage dependent switch is capable of repeatedly closing and reopening to transfer charge when said energy harvesting device is receiving mechanical energy from a cyclic mechanical energy input.

24. A circuit as recited in claim 1, wherein said solid state voltage dependent switch is capable of repeatedly closing and reopening to transfer charge when said energy harvesting device is receiving mechanical energy from random events.

* * * * *